United States Patent
Lee et al.

(10) Patent No.: US 6,375,425 B1
(45) Date of Patent: Apr. 23, 2002

(54) TRANSPIRATION COOLING IN THERMAL BARRIER COATING

(75) Inventors: Ching-Pang Lee; Robert Edward Schafrik, both of Cincinnati; Ramgopal Darolia, West Chester, all of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/707,027

(22) Filed: Nov. 6, 2000

(51) Int. Cl.[7] .............................................. F04D 29/58
(52) U.S. Cl. ................. 416/97 R; 416/241 B; 29/889.721
(58) Field of Search ................. 415/115, 177, 415/178, 200; 416/96 R, 97 R, 229 R, 229 A, 241 R, 241 B; 427/454, 142; 29/889.1, 889.72, 889.721

(56) References Cited

U.S. PATENT DOCUMENTS

| | | | |
|---|---|---|---|
| 2,946,681 A | 7/1960 | Probst et al. ............... 75/208 |
| 3,011,761 A | 12/1961 | Conway et al. .......... 253/39.15 |
| 3,240,468 A | 3/1966 | Watts et al. ............. 253/39.15 |
| 3,793,861 A | 2/1974 | Burkhard et al. ............. 62/315 |
| 3,963,368 A | 6/1976 | Emmerson .................. 415/115 |
| 4,022,542 A | 5/1977 | Barbeau ...................... 416/97 |
| 4,055,705 A | 10/1977 | Stecura et al. .............. 428/633 |
| 4,067,662 A | 1/1978 | Rossmann ................... 416/97 |
| 4,503,130 A | 3/1985 | Bosshart et al. ............ 428/632 |
| 4,576,874 A | 3/1986 | Spengler et al. ............ 428/623 |
| 4,927,714 A | 5/1990 | Priceman .................... 428/628 |
| 5,209,645 A | 5/1993 | Kojima et al. .............. 416/241 |
| 5,439,351 A | 8/1995 | Artt ............................. 416/95 |
| 5,512,382 A * | 4/1996 | Stangman .................. 428/632 |
| 5,690,473 A | 11/1997 | Kercher ........................ 416/97 |
| 5,705,231 A | 1/1998 | Nissley et al. .............. 427/453 |
| 5,846,605 A | 12/1998 | Rickerby et al. ........... 427/255 |
| 5,941,686 A * | 8/1999 | Gupta et al. ................ 415/178 |
| 5,967,755 A | 10/1999 | Czech et al. ................ 416/241 |
| 5,981,088 A | 11/1999 | Bruce et al. ................ 428/633 |
| 6,004,620 A * | 12/1999 | Camm ........................ 427/142 |
| 6,039,537 A | 3/2000 | Scheurlen .................... 416/97 |
| 6,045,928 A | 4/2000 | Tsantrizos et al. .......... 428/623 |
| 6,171,711 B1 * | 1/2001 | Draghi et al. ............... 428/596 |

FOREIGN PATENT DOCUMENTS

DE                2503285           7/1976

* cited by examiner

*Primary Examiner*—Edward K. Look
*Assistant Examiner*—Richard Edgar
(74) *Attorney, Agent, or Firm*—Andrew C. Hess; David L. Narciso (57) ABSTRACT

A method for transpiration cooling of the flow path surface region of an engine component used in a gas turbine engine by channeling a substrate to provide cooling channels through the substrate having a diameter of about 0.005" to about 0.02" to allow passage of cooling fluid from a cooling fluid source through the cooling channels. A bond coat of about 0.0005" to about 0.005" in thickness is applied to the substrate such that the bond coat partially fills the cooling channels. A porous TBC of at least about 0.003" to about 0.01" thick is applied over the bond coat, such that the TBC completely fills the cooling channels. Cooling fluid from a cooling fluid source is passed through the cooling channels and porous TBC. Because the channel exit is filled with TBC, the cooling fluid is transmitted through the porous passageways of the TBC. The porous passageways provide a plurality of tortuous routes to the TBC surface. The present invention further comprises both the cooled flow path surface region formed by the foregoing methods and the turbine component having a porous TBC cooling system connected to a cooling fluid source for cooling the component.

19 Claims, 5 Drawing Sheets

TRANSPIRATION COOLING IN THERMAL BARRIER COATING

FIELD OF THE INVENTION

This invention relates generally to gas turbine engines, and in particular, to a cooled flow path surface region.

CROSS-REFERENCE TO RELATED APPLICATIONS

This application references co-pending applications assigned to the assignee of the present invention, which are identified as Attorney Docket No. 13DV-13513 and entitled "Directly Cooled Thermal Barrier Coating System," 13DV-13527 entitled "Multi-layer Thermal Barrier Coating with Integrated Cooling System," the contents of which are incorporated herein by reference.

BACKGROUND OF THE INVENTION

In gas turbine engines, for example, aircraft engines, air is drawn into the front of the engine, compressed by a shaft-mounted rotary-type compressor, and mixed with fuel. The mixture is burned, and the hot exhaust gases are passed through a turbine mounted on a shaft. The flow of gas turns the turbine, which turns the shaft and drives the compressor and fan. The hot exhaust gases flow from the back of the engine, driving it and the aircraft forward.

During operation of gas turbine engines, the temperatures of combustion gases may exceed 3,000° F., considerably higher than the melting temperatures of the metal parts of the engine, which are in contact with these gases. Operation of these engines at gas temperatures that are above the metal part melting temperatures is a well established art, and depends in part on supplying a cooling air to the outer surfaces of the metal parts through various methods. The metal parts of these engines that are particularly subject to high temperatures, and thus require particular attention with respect to cooling, are the metal parts forming combustors and located aft of the combustors, including the turbine blades and vanes and exhaust nozzles.

The hotter the turbine inlet gases, the more efficient is the operation of the jet engine. There is thus an incentive to raise the turbine inlet gas temperature. However, the maximum temperature of the turbine inlet gases is normally limited by the materials used to fabricate components downstream of the combustors, such as the turbine vanes and turbine blades of the turbine. In current engines, the turbine vanes and blades are made of nickel-based superalloys, and can operate at metal surface temperatures of up to 2100°–2200° F.

The metal temperatures can be maintained below melting levels with current cooling techniques by using a combination of improved cooling designs and insulating thermal barrier coatings (TBCs). For example, with regard to the metal blades and vanes employed in aircraft engines, some cooling is achieved through convection by providing passages for flow of cooling air internally within the blades so that heat may be removed from the metal structure of the blade by the cooling air. Such blades have intricate serpentine passageways within the structural metal forming the cooling circuits of the blade.

Small internal orifices have also been devised to direct this circulating cooling air from the compressor directly against certain inner surfaces of the airfoil to obtain cooling of the inner surface by impingement of the cooling air against the surface, a process known as impingement cooling. In addition, an array of small holes extending from a hollow core through the blade shell can provide for bleeding cooling air through the blade shell to the outer surface where a film of such air can protect the blade from direct contact with the hot gases passing through the engines, a process known as film cooling.

In another approach, a TBC is applied to the turbine blade component, which forms an interface between the metallic component and the hot gases of combustion. The TBC includes a ceramic coating that is applied to the external surface of metal parts within engines to impede the transfer of heat from hot combustion gases to the metal parts, thus insulating the component from the hot combustion gas. This permits the combustion gas to be hotter than would otherwise be possible with the particular material and fabrication process of the component. TBC's have also been used in combination with film cooling techniques wherein an array of fine holes extends from the hollow core through the TBC to bleed cooling air onto the outer surface of the TBC.

U.S. Pat. No. 6,039,537 to Scheurlen is directed to a turbine blade at least partly covered by a heat insulating layer system, wherein, the turbine blade has at least one interior space and a plurality of bores leading from the interior space out of the substrate. Some of the bores are covered by a heat-insulating layer, while others are not. The uncovered bores provide for film cooling. The heat insulating layer system is constructed such that flow of coolant through the covered bores is not necessary when the heat insulating layer system is intact. When a failure of the heat insulating layer system occurs, additional, previously covered bores open to aid in film cooling. Because there is no flow through the covered bores, there is no transpiration cooling.

U.S. Pat. No. 5,967,755 to Czech et al. also discloses bores passing through a covering layer having free outlet orifices. The bores remain open, not allowing for transpiration cooling.

There have also been attempts to allow cooling fluid to pass through a covering layer. For example, U. S. Pat. No. 3,240,468 to Watts et al. is directed to a hollow turbine blade jacketed with a permeable sheathing having a plurality of discrete recesses disposed behind the sheathing, to which recesses cooling fluid may be distributed through the hollow blade. The permeable sheathing is formed of powdered metal or ceramic pressed to the desired shape and dimensions and sintered. The cooling air passes through the skin of the blade forming a boundary layer around the blade. The sintering process will reduce the flow of cooling fluid available to form the boundary layer.

U.S. Pat. No. 4,067,662 to Rossmann is directed to a turbine engine blade whose outer shroud is constituted of a through-porous material. A cooling medium is able to flow through a passageway from the central core of the blade to permeate through the porous outer shroud up to the surface of the airfoil, where it forms a cooling boundary layer. The outer shroud of the core consists of a foamed, through-porous ceramic material, essentially constituted of aluminum oxide.

TBCs include well-known ceramic coatings, for example, yttrium-stabilized zirconia (YSZ). Ceramic TBC's usually do not adhere well directly to the superalloys used in the substrates. Therefore, an additional metallic layer called a bond coat is placed between the substrate and the TBC. The bond coat may be made of a nickel-containing overlay alloy, such as a NiCrAlY or a NiCoCrAlY, or other composition more resistant to environmental damage than the substrate, or alternatively, the bond coat may be a diffusion nickel aluminide or platinum aluminide whose surface oxidizes to a protective aluminum oxide scale that provides improved adherence to the ceramic top coatings. The bond coat and overlying TBC are frequently referred to as a thermal barrier system.

Improved environmental resistance to destructive oxidation and hot corrosion is desirable. In some instances, the alloying elements of the bond coat can interdiffuse with the substrate alloy. Over time, as the airfoils are refurbished, walls of the airfoils are consumed, which reduces load carrying capability and limits blade life. This interdiffusion can also reduce the environmental resistance of the coating. Even with the use of advanced cooling designs and thermal barrier coatings, it is also desirable to decrease the requirement for cooling, because reducing the demand for cooling contributes to improved overall engine operating efficiency.

While superalloys coated with thermal barrier coating systems do provide substantially improved performance over uncoated materials, there remains room for improvement. Film cooling is achieved by passing cooling air through discrete film cooling holes, typically having hole diameters ranging in size from about 0.015" to about 0.030". The film cooling holes are typically drilled with laser, EDM or ES machining. Due to mechanical limitations, each film hole has an angle ranging from 20° to 90° relative to the external surface. Therefore, each film jet exits from the hole with a velocity component perpendicular to the surface. Because of this vertical velocity component and a flow circulation around each jet due to the gas mixing, each film jet will have a tendency to lift or blow off from the external surface and mix with the hot exhaust gases, resulting in poor film cooling effectiveness.

Thus, there is an ongoing need for an improved thermal barrier coating system, wherein the environmental resistance and long-term stability of the thermal barrier coating system is improved so that higher engine efficiencies can be achieved. The bond coat temperature limit is critical to the TBC's life and is kept lower than the temperature at the outer surface of the TBC, having an upper limit of about 2100° F. Once the bond coat exceeds this temperature, the coating system can quickly deteriorate, due to high temperature mechanical deformation and oxidation, as well as increased interdiffusion of elements with the substrate alloy. The coating system can separate from the substrate exposing the underlying superalloy component to environmental damage from the hot gasses of combustion.

What is needed are improved designs that will allow turbine engine components to run at higher operating temperatures, thus improving engine performance without additional cooling air. It is also desirable to have a system that can take advantage of the thermal insulation provided by TBC. The present invention fulfills this need, and further provides related advantages.

SUMMARY OF THE INVENTION

The present invention provides for a method for transpiration cooling of the flow path surface region of an engine component used in a gas turbine engine comprising the steps of channeling a substrate to provide cooling channels or apertures through the substrate having a diameter to a diameter of about 0.0005" to about 0.02" to allow passage of cooling fluid from a cooling fluid source; applying a bond coat of about 0.0005" to about 0.005" in thickness to the substrate such that the bond coat partially fills the channels; applying a porous TBC of at least about 0.003" to about 0.01" thick to the bond coat, such that the TBC completely fills the channels; and, passing cooling fluid from a cooling fluid source through the channel and porous TBC. The cooling channels have a first end terminating as an exit orifice located on the surface of the substrate. The channel extends through the substrate and has a second end that is in fluid communication with a cooling circuit manufactured into the turbine engine component. The cooling circuit is connected to a cooling fluid supply that supplies air to the cooling fluid supply. Because the channel exit is filled with TBC, the cooling fluid is transmitted through the porous passageways of the TBC. The porous passageways are interconnected and provide a plurality of tortuous routes to the TBC surface.

The present invention further comprises both the cooled flow path surface region formed by the foregoing methods and the turbine component with the porous TBC for cooling the component.

In a different embodiment, the present invention comprises a cooling channel having a first and second end, the first end terminating in an exit orifice located on or in proximity to the surface of a substrate, the second end connecting to a cooling circuit contained within a turbine engine component. The cooling channel preferably has a diameter of about 0.002" to about 0.008". Applied to the substrate is a bond coat of about 0.0005" to about 0.005" in thickness, which partially fills the exit orifice, and first channel end. Applied to the bond coat is a porous TBC of at least about 0.003" to about 0.01" thick such that the porous TBC fills the remainder of the exit orifice and first channel end not filled by the bond coat.

An advantage of the present invention is the flow path surface region of the coated gas turbine component is actively cooled by transpiration cooling through the TBC. Transpiration cooling through the TBC lowers the TBC temperature, and allows a greater thermal gradient between the hot exhaust gas stream and the bond coat. By removing heat from this region, the integrity of the bond coat can be maintained at higher engine operating temperatures, resulting in a more efficient usage of cooling air to achieve a higher turbine engine efficiency and performance.

Another advantage of the present invention is that because the TBC is processed to be porous, cooling air is able to flow through TBC passageways and spread inside the TBC layer before exiting the TBC at its surface at a plurality of exit points at low volumes through transpiration cooling instead of exiting as discrete film jets at higher pressures and volumes, thereby preventing cooling film blow off from the TBC surface.

Still another advantage of the present invention is that the TBC filled holes have more flow resistance than open holes and, therefore, provide a more effective cross-sectional hole area compared to unfilled larger holes for flowing the same amount of air, resulting in more efficient heat transfer.

Yet another advantage is that the characteristics of many smaller passageways acting as holes with smaller flow cross-section areas will remove heat over a much larger heat transfer area more efficiently and will provide better cooling of the bond coat and the substrate than that provided by fewer larger holes expelling the same volume of cooling fluid.

Still another advantage of the present invention is that more effective cooling results in the reduction or elimination of sintering in the ceramic top coat at elevated engine operating temperatures, so that low conductivity is maintained in the TBC throughout its life.

Other features and advantages of the present invention will be apparent from the following more detailed description of the preferred embodiment, taken in conjunction with the accompanying figures which illustrate, by way of example, the principles of the invention.

DETAILED DESCRIPTION OF THE PREFERRED EMBODIMENTS

The present invention sets forth a gas turbine component having an outer coating layer and surface cooled by transpiration using a novel cooling system, by directing cooling fluid through the component to a porous TBC applied to the component and circulating cooling fluid through the porous TBC. The present invention also sets forth methods for transpiration cooling of a turbine component by directing cooling fluid to the flow path surface through the TBC applied to the turbine component. The present invention further is directed to processes for producing a porous TBC system which can be used for transpiration cooling of hot spots on any hot section component, such as turbine blades, turbine nozzles, combustors and the like.

Figure 1:
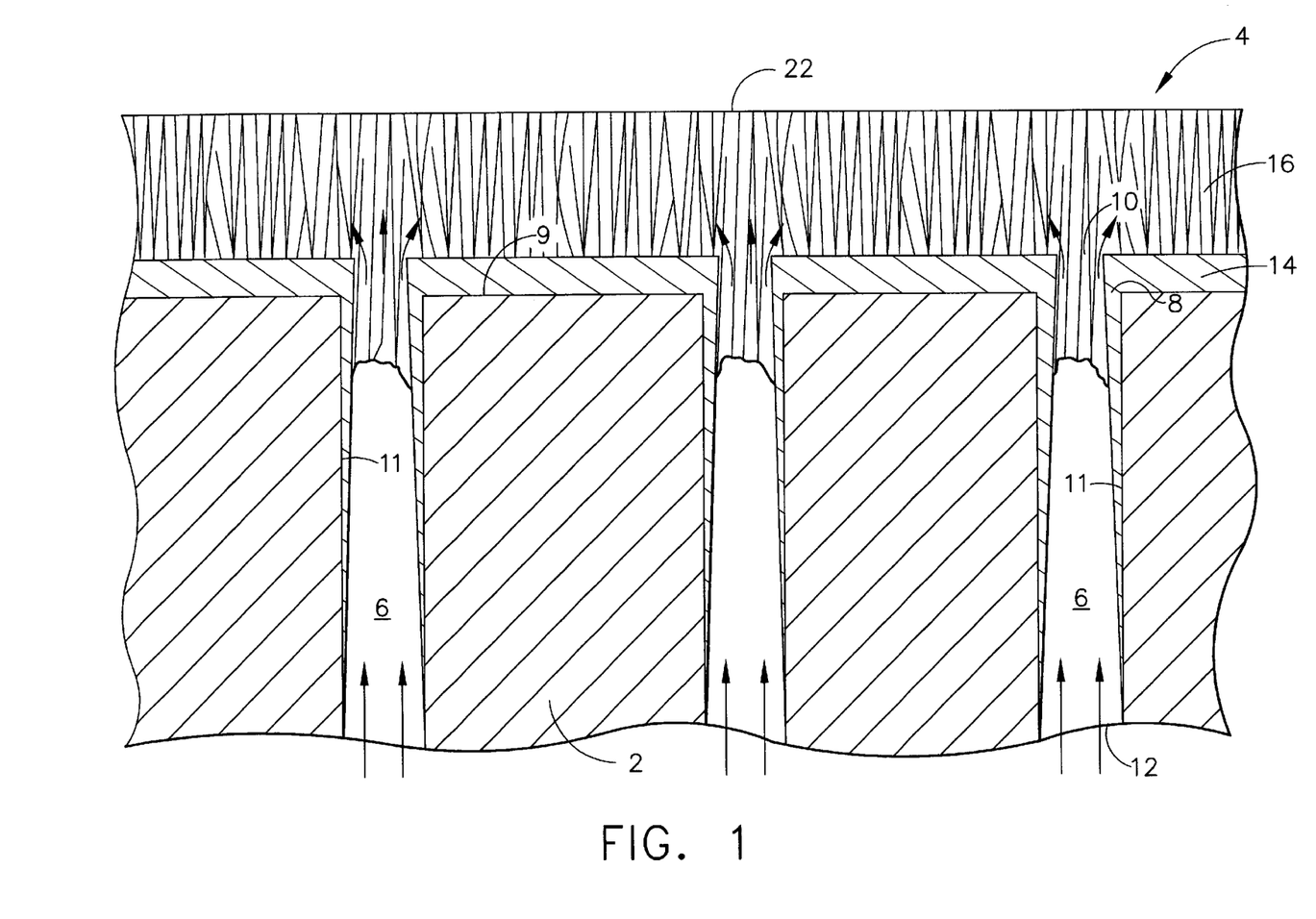
FIG. 1 is a representation of a form of a porous TBC of the present invention.

Referring now to the Figures, where like parts have the same numbers, in accordance with a preferred embodiment of the invention, there is shown in FIG. 1 a substrate 2 of, for example, a jet engine turbine blade 4. Substrate materials often used in turbine parts or airfoils for aircraft engines and power generation equipment may include nickel, cobalt, or iron based superalloys. The alloys may be cast or wrought superalloys. Examples of such substrates are GTD-111, GTD-222, Rene'80, Rene'41, Rene'125, Rene'77, Rene' N4, Rene' N5, Rene' N6, $4^{th}$ generation single crystal superalloy, MX-4, Hastelloy X, and cobalt-based HS-188.

At least one channel, and preferably a plurality of small channels 6, having a size of from about 0.0005" to about 0.02", and preferably about 0.002" to about 0.008" in diameter, are drilled, such as by laser beam machining, electrochemical machining (ECM), electrical-discharge machining (EDM) or electrostream (ES) machining, into substrate 2. The cross-sections of the channels are substantially circular, but the processing methods prevent the cross sections from being perfectly circular. Thus, the cross-sections may be slightly oval or elliptical. However, the cross-sectional shape is not limiting to the function of the channel. Alternatively, channels 6 may be cast into substrate 2. A first channel end 8 terminates at an exit orifice 10 at a surface 9 of substrate 2. Surface 9 is positioned at an end of, for example, blade 4 that extends into the gas flow path. A second end 12 of channel 6 connects to the cooling circuits (not shown) contained within a turbine engine component. These cooling circuits are similar to cooling circuits currently used to provide cooling fluid to turbine components.

A bond coat 14 is then applied to the substrate 2, for example, a diffusion aluminide such as NiAl or PtAl applied in a conventional manner over the substrate by depositing aluminum by chemical vapor deposition (CVD), vapor phase aluminiding or a pack aluminiding process and a subsequent heat treatment. Alternatively, the bond coat 14 may be a MCrAl(X) where M is an element selected from the group consisting of Fe, Co and Ni and combinations thereof and (X) is an element selected from the group of gamma prime formers, solid solution strengtheners, consisting of, for example, Ta, Re and reactive elements, such as Y, Zr, Hf, Si, grain boundary strengtheners consisting of B and C, and combinations thereof. The MCrAl(X) is applied by, for example, physical vapor deposition (PVD) processes such as electron beam (EB), ion-plasma deposition, or sputtering, and deposition temperatures can be 1600° F. or higher. Thermal spray processes such as air plasma spray (APS), low pressure plasma spray (LPPS) or high velocity oxyfuel (HVOF) spray can also be used.

The bond coat 14 is applied to a thickness of about 0.0005" to about 0.005", preferably about 0.002" in thickness. When the bond coat 14 is applied after the channels 6 have been drilled, the bond coat 14 may extend along the substrate walls 11 forming the boundaries of channels 6, partially closing the exit orifices 10 of the channels 6. In an embodiment in which bond coat 14 is applied first, followed by drilling of the small channels 6, hole blockage by the bond coat 14 should not occur, or should be minimal. However, placement of the bond coat 14 after drilling of the channels 6 is preferred, to allow bond coat 14 partial entry into the channels 6, thereby increasing ceramic TBC adherence. Application of bond coat 14 after drilling of channels 6 also provides a protective environmental coating overlying substrate walls 11.

After the channels 6 are generated and the bond coat 14 is applied, a generally porous TBC top coat 16 comprised of a porous yttrium-stabilized zirconia (YSZ) topcoat is applied on top of the bond coat 14. The porous YSZ structure can be achieved, for example, by applying the YSZ using PVD or plasma spray processes at temperatures in the range of 1600°–1800° F., which are lower than traditional YSZ application temperatures of 1800°–2150° F. Other methods may be utilized independent of the reduced temperature techniques or in combination with the reduced temperature techniques to achieve the porous YSZ structure.

The porous TBC layer 16 is applied to a thickness of at least about 0.003", preferably about to 0.003" to 0.050", and preferably about 0.005" for turbine blades and vanes. After application of about 0.005" to about 0.010" of porous ceramic TBC 16, the channels 6 are at least partially filled by the porous TBC material 16 near the exit orifices 10 of the channels 6, as the TBC is deposited on top of the bond coat adhering to walls 11, bridging channels 6. As the TBC layer 16 is applied to a thickness greater than about 0.010", the channels 6 will be completely filled with TBC which will extend across exit orifices 10 and partially down channels 6 as shown in FIG. 1.

Because TBC 16 is processed to have porosity, cooling air which flows into channels 6 will be forced through the TBC layer 16, exiting at a plurality of locations along the TBC surface 22 as transpiration cooling rather than discrete film jets. Because of the reduced volume of gas expelled at a plurality of exit locations, the problems associated with film blow off caused by expulsion of gas at one discrete location can be avoided.

Figure 2:
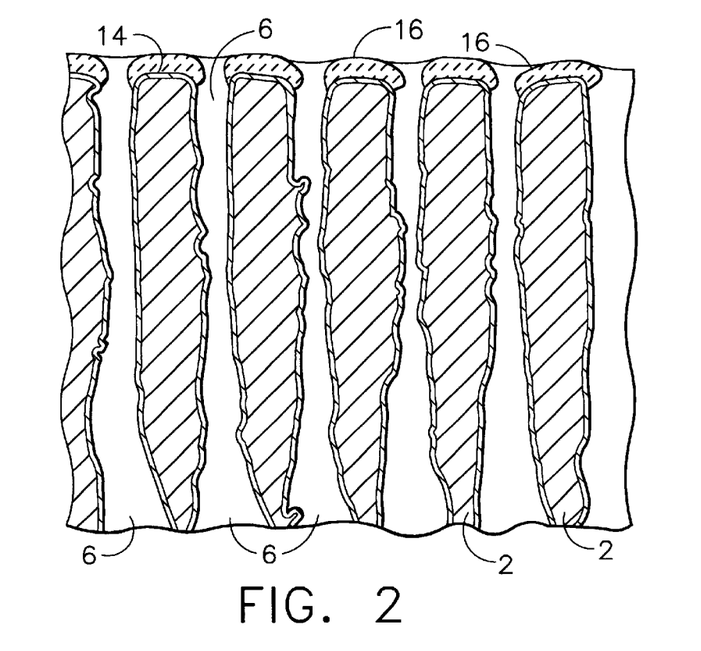
FIG. 2 is a depiction of the channels covered with a TBC system at a first contrast to highlight the bond coat.
Figure 3:
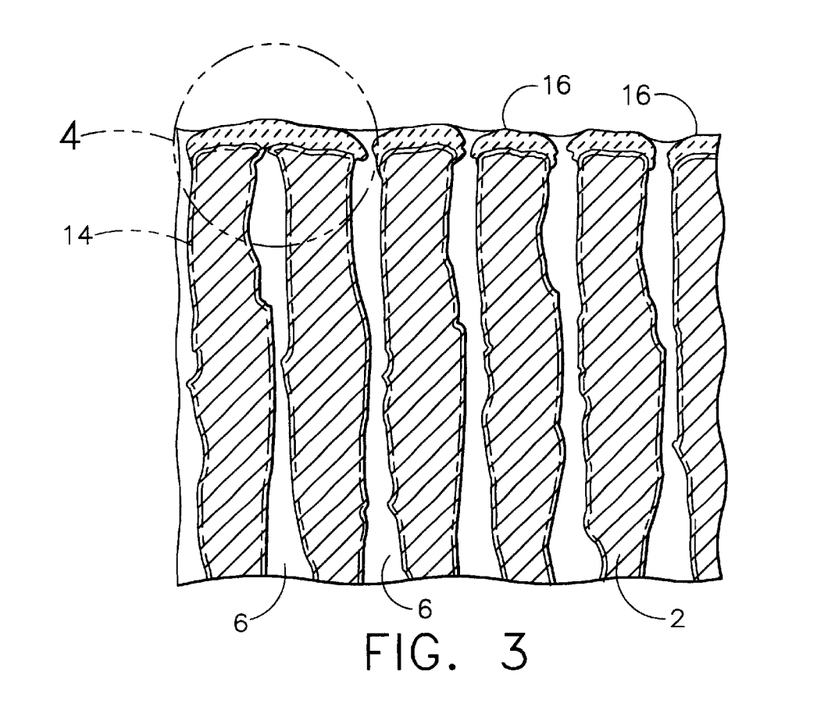
FIG. 3 is a depiction of the channels of FIG. 2 covered with a TBC system at a second contrast to highlight the ceramic top coat.
Figure 4:
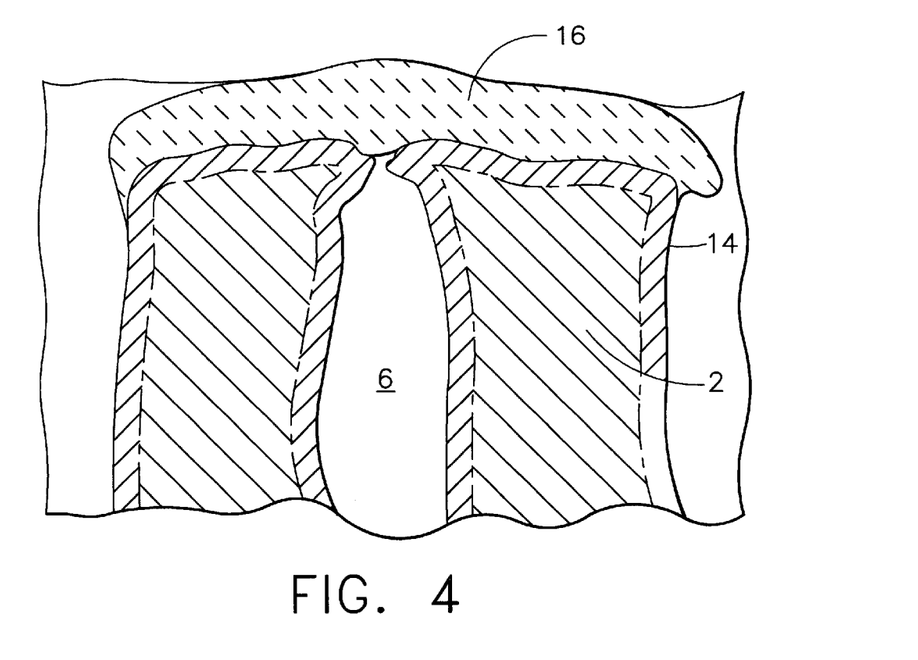
FIG. 4 is an enlarged view of section A of FIG. 3.
Figure 5:
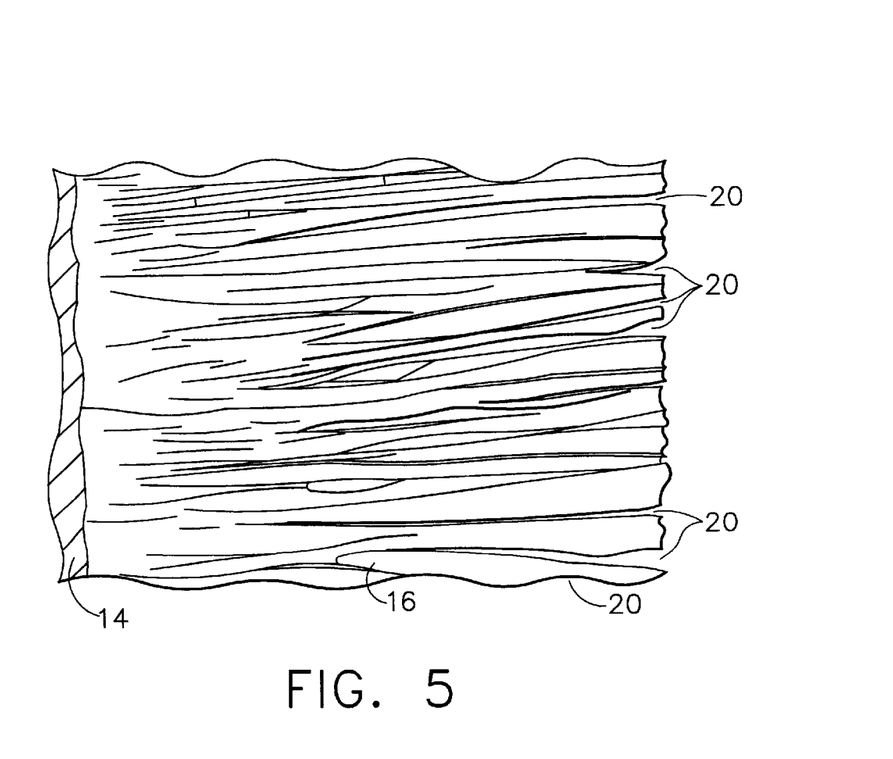
FIG. 5 is a figure showing the porosity of the TBC layer of the present invention.
Figure 6:
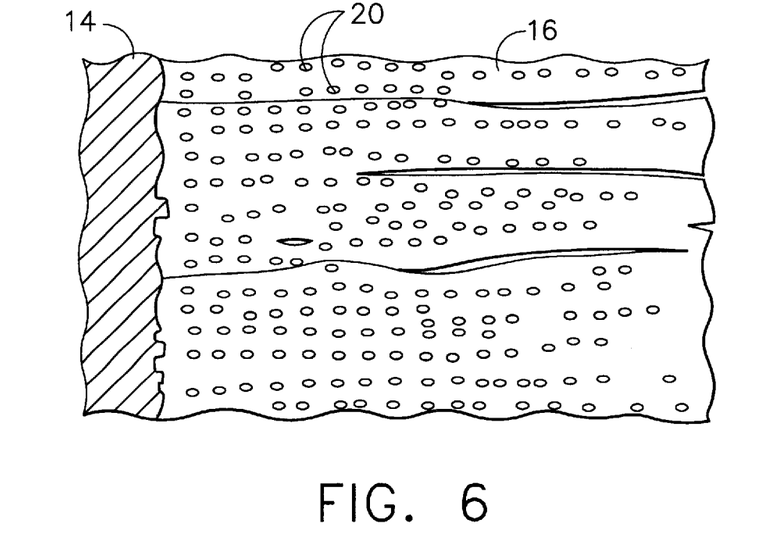
FIG. 6 is a representation of a different view of the porosity of the TBC layer of the present invention.
Figure 7:
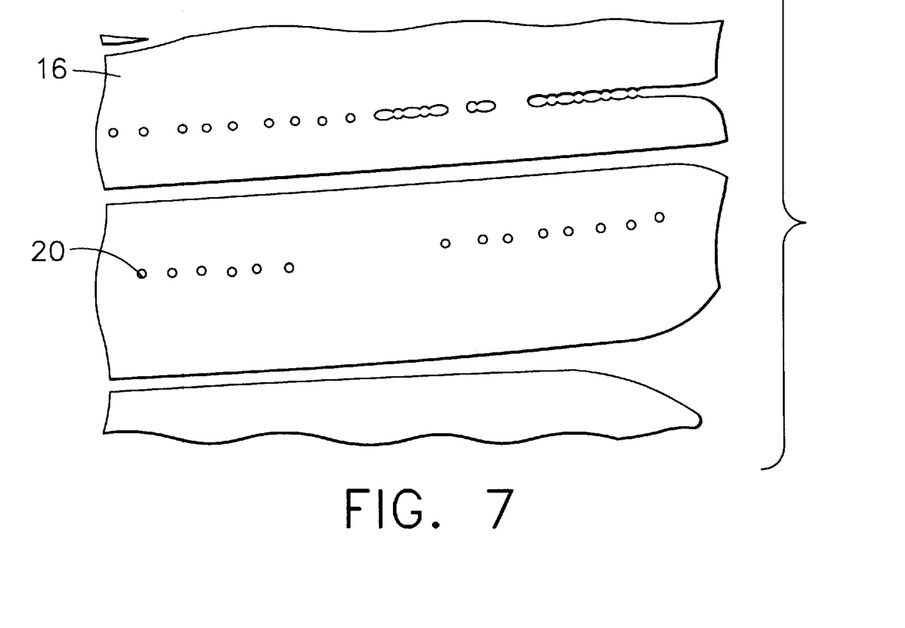
FIG. 7 is a depiction showing still a different view of the porosity of the TBC layer of the present invention.

FIG. 2 highlights the bond coat of the TBC system overlying the discrete channels utilized in film cooling. As can be seen in FIG. 3, which highlights the ceramic top coat of the TBC system and FIG. 4, the porous TBC layer 16 of the present invention completely bridges channel 6, allowing for transpiration cooling. FIGS. 5–7 are depictions of TBC 16 illustrating the porosity of the TBC layer 16.

A bond coat 14 and a porous TBC 16 are applied as described above so as to maintain the micro channels 20 directly adjacent to, or contained within the porous TBC 16. The micro channels 20 thereby allow for transpiration cooling through the generally porous TBC layer 16 as the cooling air flows from each micro channel 20 and spreads inside the TBC layer16, exiting to the TBC surface 22 at a plurality of locations where it is discharged rather than being discharged as a discrete film jet, thus avoiding the problems associated with film blow off.

The following example demonstrates the flow through porosity of the porous TBC.

EXAMPLE 1

Figure 8:
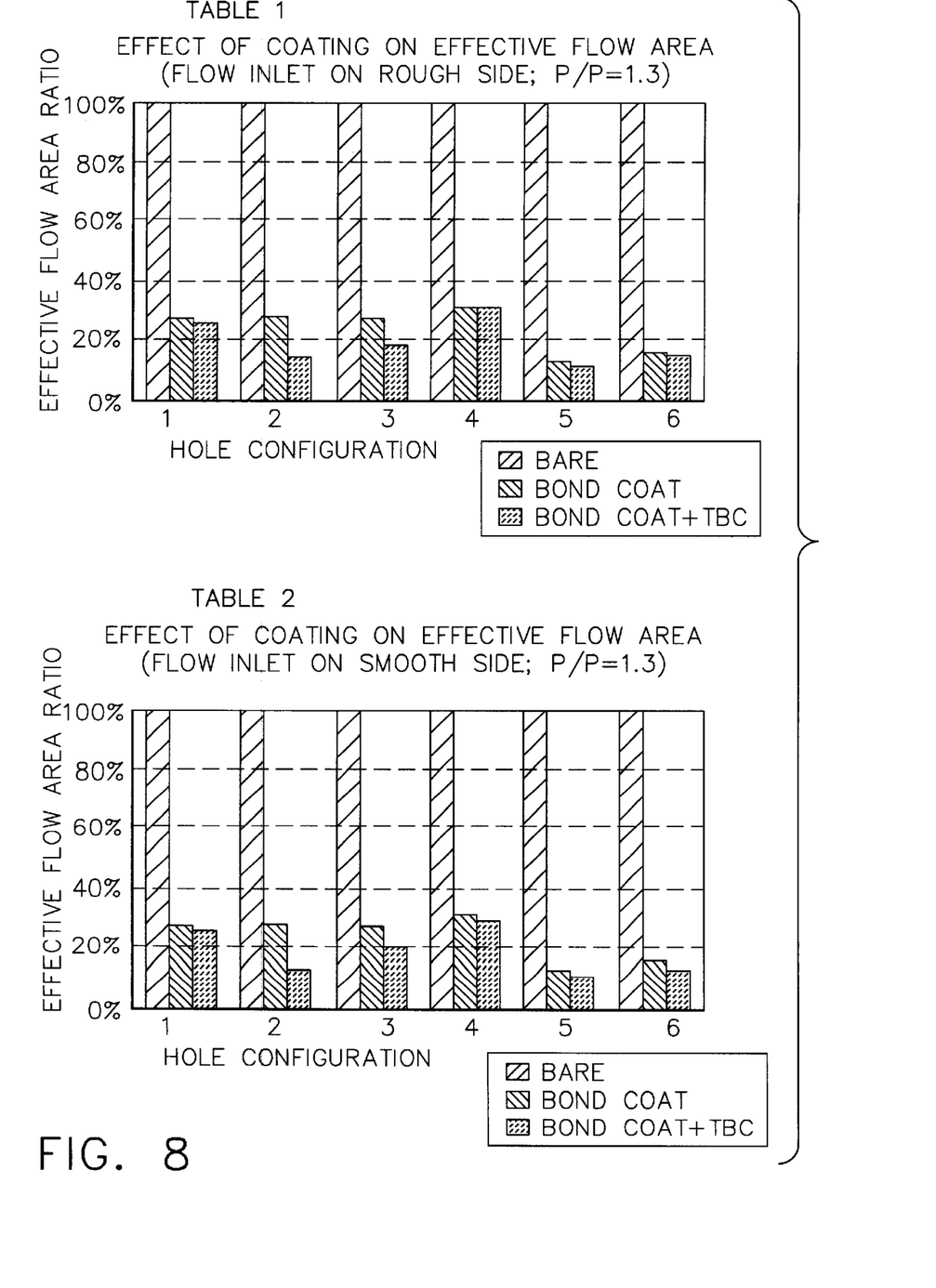
FIG. 8 depicts the flow test results of example 1.

Six sample buttons were manufactured from Rene'N5, a nickel base superalloy frequently used in the turbine portion of a gas turbine engine. Each button was 1" in diameter and 0.125" in thickness and was prepared by drilling 400 holes through the sample button perpendicular to the surface using a laser beam. One hole configuration was drilled that provided holes or apertures that were substantially circular in cross-section. The diameter of the laser-drilled holes was varied. Two buttons were produced having hole sizes of about 0.004". Two buttons were produced having hole sizes of about 0.006". Two buttons were produced having hole sizes of bout 0.008". A total of six buttons were produced. A flow of air was passed by introducing air into a first side of each bare button through a plenum fixture designed to introduce pressurized air at a pressure of 1.3 times that of ambient into the button, with the flow inlet on the rough side, and again with the flow inlet on the smooth side of the sample button. The upstream pressure, temperature, downstream pressure and total flow rate were measured and used to calculate the flow function, the effective flow area and diameter. The same measurements and calculations were performed after the addition of 0.002" bond coat to the surface of the sample button and again after the addition of 0.005" porous TBC over the previously applied bond coat. In each case, the bond coat and the porous TBC filled the hole openings on the side of the button to which they were applied. As can be seen in tables 1 and 2 of FIG. 8, the addition of a bond coat reduces the effective flow area ratio of air as compared to the flow of air through an identical uncoated sample, whereas the addition of an additional porous topcoat of TBC over the bond coat does not further significantly reduce the effective flow area ratio, demonstrating the continued effective flow of cooling fluid through the porous TBC. This indicates that primarily all of the reduction in air flow is due to the addition of the bond coat. The roughness of the substrate surface does not appear as a major factor.

The cooling fluid, which is at an elevated temperature as it extracts heat from the TBC, is expelled, typically into the gas stream. In this manner, the bond coat 14 is kept at a reduced temperature through transpiration cooling as the TBC is cooled by the fluid as it flows through the porous TBC. Utilizing the transpiration cooling provided by the present invention will allow a gas turbine engine to be operated at temperatures of as much as about 150° F. hotter than those presently employed, with a resulting dramatic increase in engine efficiencies.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A cooling system for transpiration cooling of the flow path surface region of an engine component used in a gas turbine engine comprising:

at least one channel having a first and second end, the first end terminating in an exit orifice located on a surface of a substrate, the second end in fluid communication with a cooling circuit contained within a turbine engine component, wherein the channel has a diameter of about 0.0005" to about 0.02";

a bond coat having a thickness of about 0.0005" to about 0.005" applied to the substrate surface, wherein the bond coat partially fills the exit orifice of the at least one channel at the first channel end; and, a TBC layer having a preselected density applied to the bond coat such that the TBC fills the remainder of the exit orifice at the first channel end, and having a thickness of at least about 0.003" applied over the bond coat, the preselected density being sufficient to permit diffusion and discharge of a cooling fluid.

2. The cooling system of claim 1 wherein the at least one channel has a substantially circular cross-section.

3. The cooling system of claim 1 wherein the at least one channel has a substantially elliptical cross-section.

4. The cooling system of claim 1 wherein the at least one channel has a diameter of about 0.002–0.008".

5. The cooling system of claim 1 wherein the bond coat has a thickness of about 0.002".

6. The cooling system of claim 1 wherein the TBC layer is applied to a thickness of about 0.01" or greater.

7. The cooling system of claim 1 wherein the TBC layer is applied to a thickness of about 0.005–0.010".

8. The cooling system of claim 1 further including a cooling fluid supplied to the at least one cooling channel from the cooling circuit, the cooling fluid entering the 5 porous TBC layer at the exit orifice and exiting the TBC layer at the TBC outer surface.

9. The cooling system of claim 1 wherein the bond coat is an aluminide selected from the group consisting of NiAl and PtAl and combinations thereof.

10. The cooling system of claim 1 wherein the bond coat is a MCrAl(X) where M is an element selected from the group consisting of Fe, Co and Ni and X is an element selected from the group consisting of gamma prime formers, solid solution strengtheners, grain boundary strengtheners, reactive elements and combinations thereof.

11. A method for providing a system for transpiration cooling of the flow path surface region of an engine component used in a gas turbine engine comprising the steps of:

channeling a substrate to provide at least one cooling channel having a cross-sectional size of about 0.0005" to about 0.02" to allow passage of a cooling fluid from a cooling fluid source;

applying a bond coat of about 0.0005" to about 0.005" in thickness to the substrate such that the bond coat partially fills the at least one cooling channel;

applying a layer of TBC having a predetermined density, sufficient to permit the flow of the cooling fluid through the TBC, over the bond coat to a thickness sufficient to fill the remainder of the at least one cooling channel not filled by the bond coat; and, passing cooling fluid from the cooling fluid source through the at least one channel and into the porous TBC layer.

12. The method of claim 11 wherein the step of channeling a substrate to provide at least one cooling channel includes drilling at least one cooling channel through the substrate using at least one method selected from the group consisting of laser beam machining, electrochemical machining, electrical-discharge machining and electrostream machining and combinations thereof.

13. The method of claim 12 wherein the step of channeling a substrate to provide at least one cooling channel in the substrate includes laser beam drilling.

14. The method of claim 11 wherein the step of channeling produces at least one cooling channel having a substantially circular cross-sectional shape.

15. The method of claim 11 wherein the step of channeling produces at least one cooling channel having a substantially elliptical cross-sectional shape.

16. The method of claim 11 wherein the step of channeling a substrate includes providing a channel having a diameter of about 0.002" to about 0.008" to allow passage of cooling fluid from a cooling fluid source.

17. The method of claim of claim 11 wherein the step of applying a bond coat includes applying a bond coat having a thickness of 0.002" to the substrate that partially fills the at least one cooling channel.

18. The method of claim 11 wherein the step of applying a porous TBC layer having a predetermined density over the bond coat to a thickness sufficient to fill the remainder of the at least one cooling channel at the exit orifice not filled by the bond coat includes applying a TBC layer having a thickness of 0.005" to 0.010".

19. A method for transpiration cooling of a flow path surface region of a turbine engine component, comprising the steps of:

providing a turbine engine component comprised of a substrate having an outer surface and a cooling circuit, the component having a plurality of cooling channels in fluid communication with and extending between the cooling circuit and the outer surface, the cooling channels having a substantially circular cross-section and a diameter of from about 0.002–0.008";

applying a bond coat having a first preselected thickness over the outer surface of the substrate and a TBC having a second preselected thickness and having a preselected density over the bond coat so that the bond coat and the TBC fill the cooling channels in the vicinity of the substrate outer surface;

providing a cooling fluid to the cooling channels from the cooling surface so that the cooling fluid enters the cooling channel and is introduced into the TBC having a preselected density, the cooling fluid diffusing through the TBC, thereby providing transpiration cooling as the fluid removes heat from the TBC prior to exiting the TBC along a TBC surface opposite the substrate surface.

* * * * *